Figure 1:
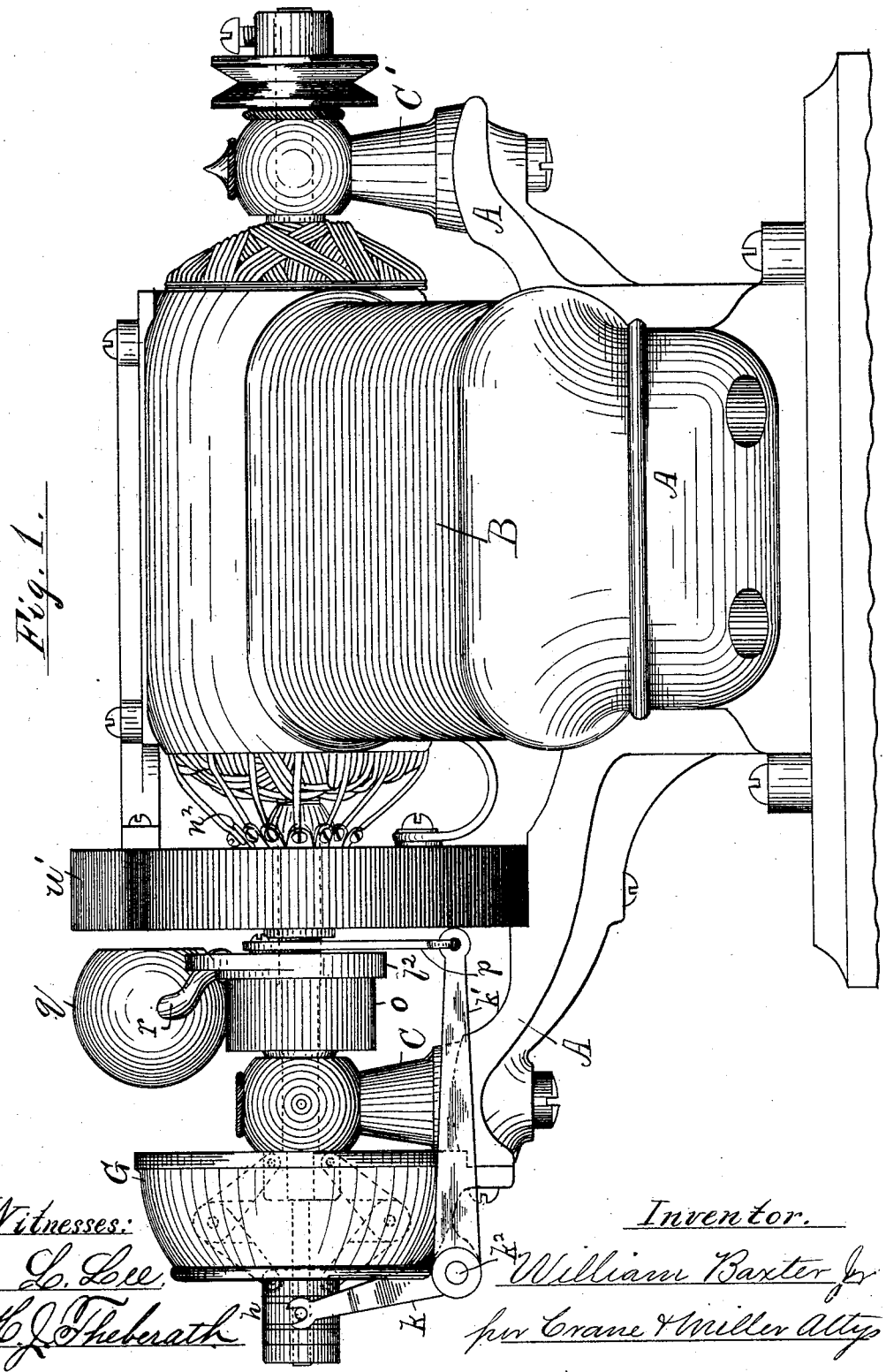

(No Model.) 3 Sheets—Sheet 1.

W. BAXTER, Jr.
HORIZONTAL GOVERNOR FOR ELECTRIC MOTORS.

No. 361,116. Patented Apr. 12, 1887.

Witnesses:
L. Lee,
H. J. Theberath

Inventor.
William Baxter Jr
per Crane & Miller Attys (No Model.) 3 Sheets—Sheet 2.
W. BAXTER, Jr.
HORIZONTAL GOVERNOR FOR ELECTRIC MOTORS.
No. 361,116. Patented Apr. 12, 1887.
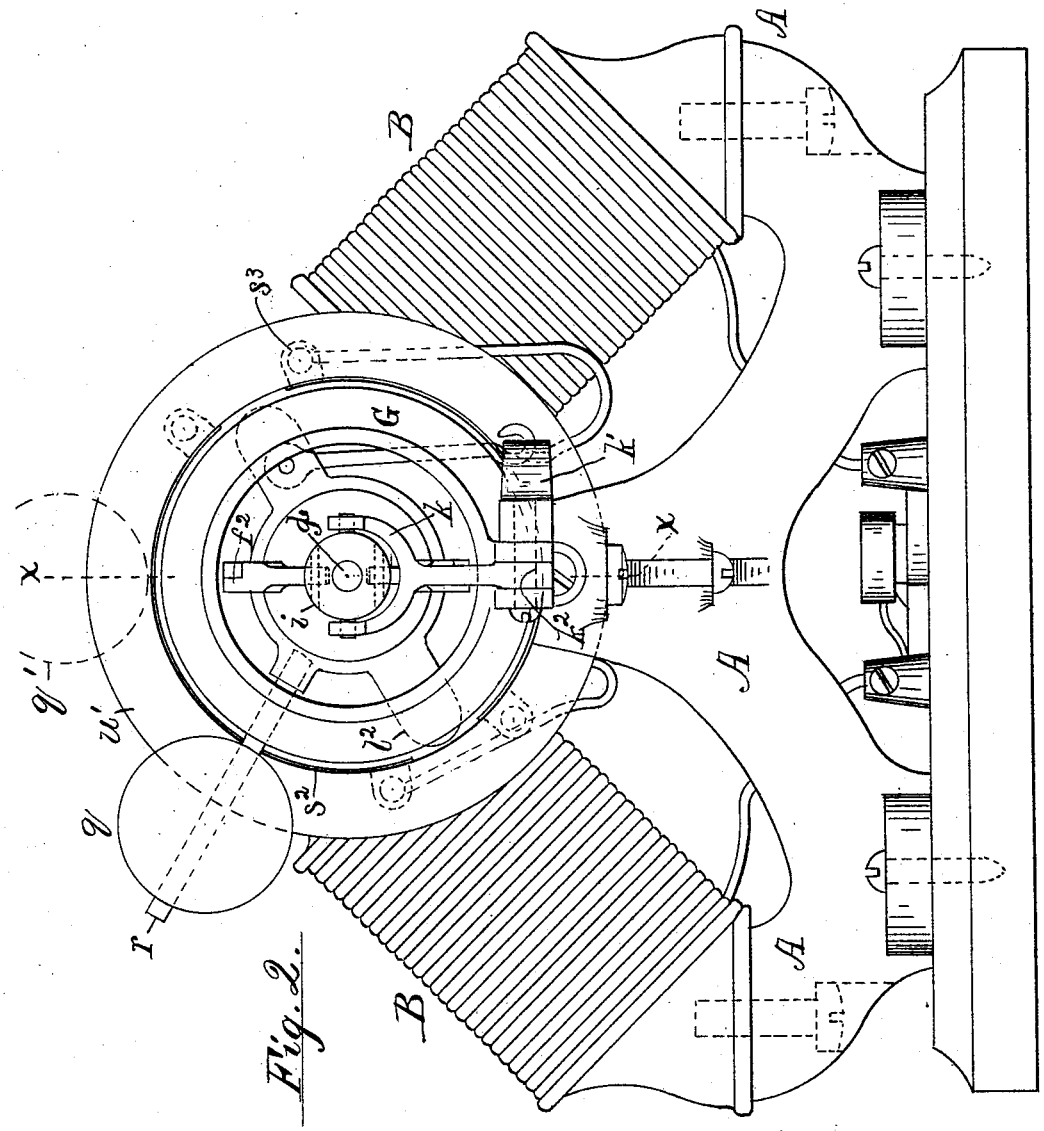
Witnesses:
L. Lee
Henry J. Theberath
Inventor.
William Baxter Jr
per Crane & Miller, Attys (No Model.) 3 Sheets—Sheet 3.
W. BAXTER, Jr.
HORIZONTAL GOVERNOR FOR ELECTRIC MOTORS.
No. 361,116. Patented Apr. 12, 1887.
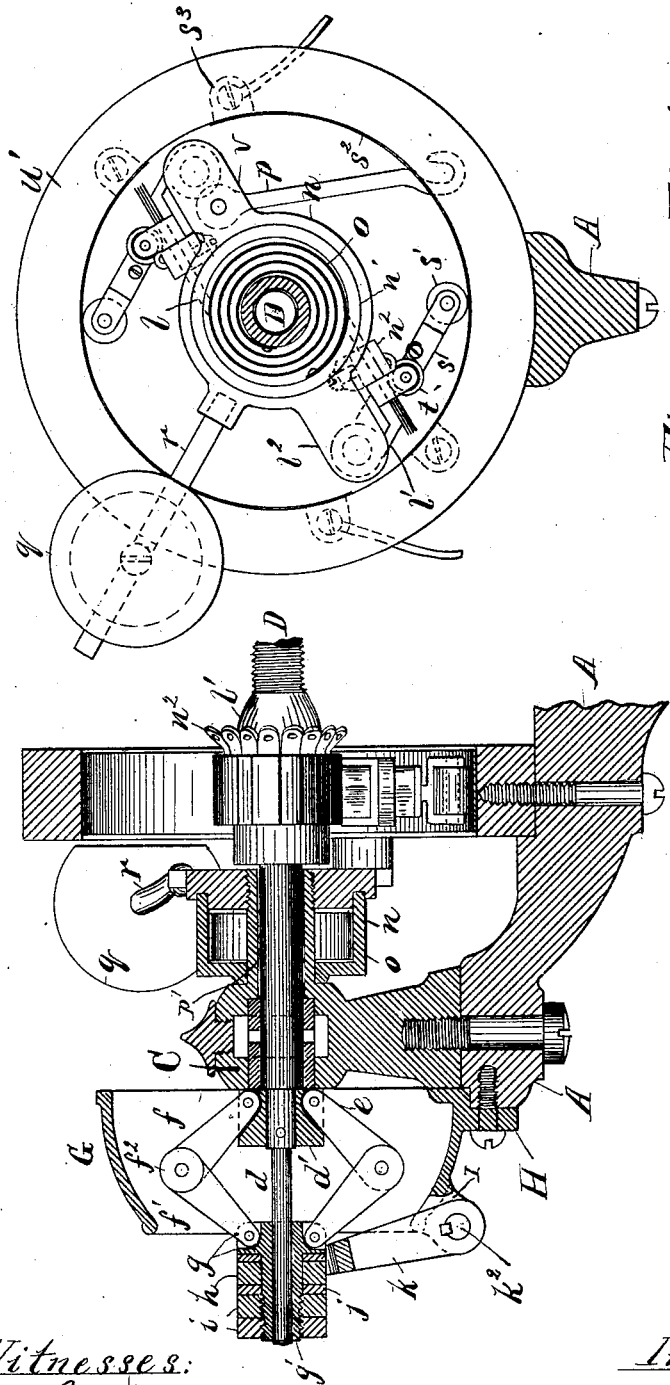
Witnesses:
L. Lee
Henry J. Theburath
Inventor
William Baxter Jr.
per Crane & Miller Attys

UNITED STATES PATENT OFFICE.

WILLIAM BAXTER, JR., OF BALTIMORE COUNTY, MARYLAND, ASSIGNOR TO THE BAXTER ELECTRIC MANUFACTURING AND MOTOR COMPANY.

HORIZONTAL GOVERNOR FOR ELECTRIC MOTORS.

SPECIFICATION forming part of Letters Patent No. 361,116, dated April 12, 1887.

Application filed October 27, 1886. Serial No. 217,307. (No model.)

*To all whom it may concern:*

Be it known that I, WILLIAM BAXTER, Jr., a citizen of the United States, residing in Baltimore county, Maryland, have invented certain new and useful Improvements in Horizontal Governors, fully described and represented in the following specification and the accompanying drawings, forming a part of the same.

The object of this invention is to furnish a governor which remains substantially inoperative until the desired speed of the engine is attained, and which is susceptible of prompt action through its entire range of motion within a comparatively small range of variation above such normal speed.

In my invention the centrifugal action of the governor is resisted by a spring; but as the resistance of the spring naturally increases with the expansion of the governor and its increased rate of speed, it is obvious that the movement of the governor is resisted with an increased force as it attains a higher speed of rotation, and such increased force would tend to prevent the free movement of the governor within a limited range above its normal velocity.

To correct the increasing resistance of the spring and to oppose the governor by a nearly uniform resistance, I combine with the spring a weight opposing a gradually-decreasing resistance and make the action of the weight adjustable, so that its effect upon the governor may be regulated at pleasure.

It is obvious that a uniform resistance will not balance the augmented power of the governor at an increased rate of speed. Therefore a very slight increase in speed is sufficient to render it most effective in actuating the regulating devices.

My improvements are shown herein applied to an electric motor, in which a high rate of speed is commonly required, and in which it is desirable to effect a prompt regulation of the speed within a small limit above the normal velocity; but the governor may be applied to any other use where it may be situated upon a horizontal shaft and its centrifugal force opposed by a spring. I have also shown herein an improved construction for the brush-holders in an electric motor, and means of making a movable connection between the same and the field-circuit.

In the drawings, Figure 1 is a side elevation of an electric motor provided with my improvements. Fig. 2 is an end view of the same. Fig. 3 is a central vertical section of the governor and its parts on line $x\ x$ in Fig. 2. Fig. 4 is a transverse section of the spring-box and an elevation of the means for making a movable connection between the brushes and the field-magnet. Fig. 5 is an end view of the stationary governor-pivot; Fig. 6, a side view, and Fig. 7 a view of the inner end of the movable governor-sleeve. Fig. 8 is a side view of the governor-swivel; Fig. 9, a side view of the swivel-washer; Fig. 10, an end view of one of the brush-holders and its roller-arm detached, and Fig. 11 a side view of the same.

A represents the frame of the motor, sustaining the field-magnets B and bearings C C' for the main arbor D.

$d$ is a shaft or an extension of the arbor beyond the bearing C, and $d'$ is a hub secured rigidly to the same, containing pivots $e$ for the inner ends of the governor-links.

$f f'$ are the governor-links, the outer ends of the latter being pivoted by pins $g$ to a sleeve, $g'$, fitted to slide freely upon the shaft $d$.

A swivel or collar, $h$, is secured upon the sleeve between a shoulder at its inner end and nuts $i$ at its outer end, and a washer, $j$, is interposed between the nuts and the swivel, to diminish the friction caused by the thrust of the sleeve toward the swivel $h$ when in operation. The centrifugal force throwing the ends, $f^2$, of the governor-arms outward draws the sleeve $g'$ toward the bearing C, and the swivel-collar $h$ is provided with pins $h'$, by which its movement is transmitted to a bell-crank, $k\ k'$, to shift the brushes $l$ upon the commutator $m$.

The brush-carriers $l'$ are pivoted at the opposite ends of arms $l^2$, which are attached to a spring-box, $n$, containing a spring, $o$, the inner end of which is secured to a stationary bush, $p'$, projected from the bearing C.

In Fig. 4 the arms $l^2$ are shown turned with the brushes resting upon the commutator, as when the motor is first started, and a weight, $q$, is affixed to an arm, $r$, projected from the spring-box in such position that its weight tends to unwind the spring in the box when thus placed. The movement of the bell-crank arm downward, as is effected by an increased velocity of the governor, operates simultaneously against the weight, which it is compelled to raise toward a vertical position, and against the tension of the spring, which is at the same time coiled tighter by the rotation of the spring-box $n$.

Mounting the weight to turn around a horizontal axis obviously decreases its leverage as it moves toward a vertical plane through such axis, and a diminishing resistance to the governor is thus produced by the weight to counteract the increasing tension of the spring produced by the same rotation.

The resistance of the weight is obviously nothing when moved over its own axis, as shown in the dotted lines $q'$ in Fig. 2, and as its initial resistance may be varied by its adjustment upon the arm $r$, its range of effect may be correspondingly varied during its movement to the vertical position, and the action of the governor be regulated in the most accurate manner.

The spring and weight are so adjusted to the normal velocity of the governor that the weight $q$ is carried past the vertical line by any great excess above such velocity, and the movement of the weight being downward thereafter tends, with any further acceleration in the speed of the governor, to oppose the tension of the spring and to assist the governor in moving the regulating device attached thereto with great ease and rapidity.

The weight $q$ is made adjustable upon the arm $r$, so that its leverage may be varied at pleasure, and its effect upon the normal speed of the governor and its resistance to the action of the same below the desired limit may thus be changed as required.

The spring $o$ is shown in Figs. 3 and 4 as a flat clock-spring coiled within the box $n$, and at one end secured to the box, as by the screw $n'$, and the other end secured to a stationary point, as the bush $p'$; but this construction of the spring is immaterial, as a wire spirally wound may be applied to the brush-carrying arms in any convenient manner, provided the weight be connected therewith at one side of the vertical line, and adapted to move to the other side of such line when the governor has reached its normal limit of speed.

To avoid resistance to the action of the governor, I have devised a movable or rolling electrical connection between the brushes and the field-circuit, each brush-carrier $l'$ having an arm, $s$, pivoted at its outer end, and provided with a roller, $s'$, bearing upon a metallic segment, $s^2$, which is sustained concentric with the arbor $D$, and connected with the wires $u$ from the field-magnets $B$. Each segment is represented as mounted in a wooden ring, $u'$, secured to the frame $A$ concentric with the commutator, and each segment, as shown in Figs. 2 and 4, is held in place by ears $s^3$, which are secured against the inner flat side of the wooden ring $u'$, and serve partly to make the electric connection with the wires $u$.

Each brush-carrier is insulated upon the arms $l^2$, and the current is conducted to the brush entirely through the arm $s$ and roller $s'$, which bears upon the segment $s^2$. A coiled spring, $t$, is wound around the pivot of the arm $s$, and has one end attached to the arm, while the other bears upon the socket $n^2$, in which the brush $l$ is secured by a screw, $l^3$. The reaction of the spring thus operates both to press the brush upon the commutator and the roller $s'$ against the segment.

The tension of the spring $t$ is adjusted by the manufacturer to produce the desired pressure of the brush upon the commutator, and the rotation of the roller produces an electrical contact upon the segment $s^2$ without producing any prejudicial resistance to the action of the governor.

The governor-links are somewhat larger at their outer ends, $f^2$, which suffices to produce the tangential inertia required at the high velocity employed.

When supplied with my governor, I have found that an electric motor may be operated at two thousand to five thousand revolutions per minute with a full load, and the entire load thrown off without affecting the speed of the armature more than three per cent.

In Fig. 2 the weight $q$, as represented in dotted lines $q'$, over the center of the arbor would obviously exert no resistance to the movement of the governor. Should the speed of the motor carry the weight past such central line, it is obvious that its weight would then operate very effectively in assisting the governor to move the brushes upon the commutator in the desired manner to diminish the velocity as required.

The links $f f'$ differ in my construction from the links used to pivot a weight to a fulcrum in other governors in this respect: that, owing to the high velocity employed, but very little weight is required to generate the needed force, and my links serve as such weights independently of any other mass attached to them at any specific point. They may therefore be termed "link-weights," and the centrifugal force generated by their rotation is the effective agent by which the governor operates to actuate the regulating devices as desired. To this centrifugal force are opposed the gradually-increasing force of the spring $o$ and the gradually-diminishing force of the weight $q$, the average resultant of these opposed forces being slightly greater than the centrifugal force, so as to make the governor move steadily and without the vibrations common in governors which are too closely balanced. The essential part of my invention is the opposition to the centrifugal force of the rapidly-revolving governor-weights of two forces, one increasing and the other diminishing, so as to present an average resistance, which may be rendered nearly equal by suitable adjustment, and which may be conveniently varied by altering the tension of one of the opposing forces when required. This, in my present construction, is effected by shifting the weight $q$ upon the arm $r r$.

From the above description my governor-links will be understood to be link-weights, and to possess all the functions of the actual weights movable around their fulcra upon cylinder or light arms in other constructions.

The governor-links, which revolve rapidly with the shaft $d$, are surrounded by a guard, G, which consists in a circular casing attached to the frame A by a foot, H. Such guard is formed at its lower side with lugs I, which carry the fulcrum $k^2$ for the bell-crank $k k'$, and thus sustain the latter in a convenient relation to the swivel $h$, which is overhung considerably beyond the bearing C. The arm $k'$ is bent to one side of the bearing C, as shown in Fig. 2, and its end thus comes vertically beneath the pin $v$ upon the arm $l^2$, with which the bell-crank is connected by a link, P.

From the above description it will be seen that the essential feature of my improvement in the governor is the combination therewith of a spring and a weight acting in conjunction with the spring, and arranged to move toward or beyond a vertical plane through the arbor around which the weight turns, so as to act in opposition to the spring when the normal velocity is greatly exceeded.

The essential feature of the improvement in the brush-connections consists in the segment in electrical connection with one of the field-magnets, and a roller pressed elastically upon the segment and in electrical connection with the brush. Such a construction for the brush-connections permits them to move with the utmost ease, while avoiding the use of a flexible wire cord, such as is often used to connect the movable brush-holder with the magnet, and the freedom of movement thus secured for the brush-holder arms enables the governor to move the same with the utmost facility and promptness.

Having thus set forth my invention, what I claim herein is—

1. In a horizontal governor, the combination, with the rotating weights employed for generating the centrifugal force, of two agencies—as a spring and a weight—exerting opposition to such centrifugal force, one of such agencies exerting a gradually-increasing resistance, the other exerting a gradually-decreasing resistance, and one of such agencies being adjustable to vary its resistance, and the whole being operated as and for the purpose set forth.

2. In a horizontal governor, the combination, with the rotating shaft $d$, of the fixed hub $d'$, the movable sleeve $g'$, and the links $f f'$, pivoted thereto and to one another, a lever actuated by the sleeve, an arm rotated around the shaft $d$ by the said lever, and a spiral spring connected with said arm and with a fixed support and resisting the movement of the governor, as and for the purpose set forth.

3. In a horizontal governor, the combination, with the rotating links, of a movable sleeve, as $g'$, a lever, as $k k'$, an arm rotated around a horizontal arbor by said lever, a spiral spring connected with said arm and with a fixed support and resisting the movement of the governor, and a weight connected with said rotating arm and resisting the movement of the governor with a gradually-decreasing force, as and for the purpose set forth.

4. In an electric motor having a horizontal arbor carrying the armature and its commutator, the governor-links $f f'$, rotated with the arbor and pivoted to the sleeve $g'$, the swivel $h$ and washer $j$ upon said sleeve, the bell-crank $k k'$, pivoted adjacent to the governor-shaft, the spring-box $n$, pivoted upon a bush about the arbor of the armature, the arms $l^2$ and the arm $r$, rotated with the spring-box, the link $w$, connecting the bell-crank with the spring-box, the spring $o$, attached to the stationary bush and to the spring-box and rotating the latter in opposition to the force of the governor, and the weight $q$, fixed adjustably upon the arm $r$, the whole arranged and operated substantially as and for the purpose set forth.

5. In an electric motor, the combination, with the bearing C for the arbor D, of the governor consisting of the links $f f'$, rotated by an extension of the arbor outside of the bearing C, and the guard G, sustained upon the frame about the rotating governor-links, as and for the purpose set forth.

6. In an electric motor, the combination, with the bearing C for the arbor D, of the governor consisting in the links $f f'$, rotated by an extension of the arbor outside of the bearing C, the arms for the brush-carriers mounted upon a bushing inside the bearing C, and the bell-crank $k k'$, pivoted upon the guard G and connected with the brush-carrying arms, all substantially as shown and described.

7. In an electric motor, the combination, with the commutator and a governor for turning the brush-carrying arms around the commutator, of two segments, $s^2$, supported concentrically about the commutator and connected, respectively, with the two field-magnets, the jointed arm $s$, pivoted to each of the brush-holders, the roller $s'$, fitted in the outer end of the arm $s$, and the spring $t$, operating to press the roller upon the segment $s^2$ and the brush upon the commutator, all substantially as herein shown and described.

In testimony whereof I have hereunto set my hand in the presence of two subscribing witnesses.

WM. BAXTER, Jr.

Witnesses:
D. J. JUVENAL,
ADAM NAUS, Jr.